(12) United States Patent
Ng et al.

(10) Patent No.: US 11,170,788 B2
(45) Date of Patent: Nov. 9, 2021

(54) SPEAKER RECOGNITION

(71) Applicant: Emotech Ltd, London (GB)

(72) Inventors: Raymond W. M. Ng, London (GB); Xuechen Liu, London (GB); Pawel Swietojanski, London (GB)

(73) Assignee: Emotech Ltd., London (GB)

( * ) Notice: Subject to any disclaimer, the term of this patent is extended or adjusted under 35 U.S.C. 154(b) by 252 days.

(21) Appl. No.: 16/417,198

(22) Filed: May 20, 2019

(65) Prior Publication Data

US 2019/0355366 A1    Nov. 21, 2019

(30) Foreign Application Priority Data

May 18, 2018 (GB) ..................................... 1808118

(51) Int. Cl.
| | | |
|---|---|---|
| *G10L 17/18* | (2013.01) | |
| *G06N 3/08* | (2006.01) | |
| *G06N 3/04* | (2006.01) | |
| *G10L 17/04* | (2013.01) | |

(52) U.S. Cl.
CPC ............. *G10L 17/18* (2013.01); *G06N 3/0454* (2013.01); *G06N 3/08* (2013.01); *G10L 17/04* (2013.01)

(58) Field of Classification Search
None
See application file for complete search history.

(56) References Cited

U.S. PATENT DOCUMENTS

| | | | | |
|---|---|---|---|---|
| 5,619,619 A | * | 4/1997 | Shinohara | ............... G06F 3/011 |
| | | | | 706/28 |
| 8,775,341 B1 | * | 7/2014 | Commons | ............... G10L 15/16 |
| | | | | 706/20 |
| 9,824,692 B1 | | 11/2017 | Khoury et al. | |
| 2007/0288236 A1 | * | 12/2007 | Kim | ........................ G10L 25/93 |
| | | | | 704/231 |

(Continued)

FOREIGN PATENT DOCUMENTS

| | | |
|---|---|---|
| CN | 107016999 A | 8/2017 |
| CN | 107369440 A | 11/2017 |

OTHER PUBLICATIONS

Combined Search and Examination Report dated Oct. 8, 2018 for GB Application No. GB1808118.2.

(Continued)

*Primary Examiner* — Neeraj Sharma
(74) *Attorney, Agent, or Firm* — EIP US LLP

(57) ABSTRACT

A speaker recognition system comprises (i) at least one microphone operable to output data representing speech of a speaker and (ii) a controller. The controller is operable to: (a) receive the data output from the at least one microphone; (b) process the received data using a first artificial neural network to obtain first output data, the first artificial neural network having been trained based on outputs of a second artificial neural network, the second artificial neural network having been trained to perform speaker recognition; and (c) identify the speaker using the first output data. The first artificial neural network comprises fewer layers and/or fewer parameters than the second artificial neural network. The first artificial neural network is configured to emulate a result derivable using an output of the second artificial neural network.

17 Claims, 6 Drawing Sheets

(56) References Cited

U.S. PATENT DOCUMENTS

| | | | |
|---|---|---|---|
| 2008/0228680 A1* | 9/2008 | Chen | G06N 3/0454 |
| | | | 706/21 |
| 2012/0313849 A1* | 12/2012 | Bak | G06F 3/167 |
| | | | 345/156 |
| 2016/0078339 A1 | 3/2016 | Li et al. | |
| 2016/0098646 A1* | 4/2016 | Gomez | G06N 20/00 |
| | | | 706/12 |
| 2016/0217367 A1 | 7/2016 | Moreno et al. | |
| 2017/0011738 A1 | 1/2017 | Senior et al. | |
| 2017/0069327 A1* | 3/2017 | Heigold | G10L 17/18 |
| 2017/0125020 A1* | 5/2017 | Seo | G10L 15/144 |
| 2018/0018973 A1 | 1/2018 | Moreno et al. | |
| 2018/0082691 A1* | 3/2018 | Khoury | G10L 17/18 |
| 2018/0158463 A1* | 6/2018 | Ge | G10L 17/04 |
| 2018/0293988 A1* | 10/2018 | Huang | G10L 17/20 |
| 2019/0043508 A1* | 2/2019 | Sak | G10L 17/18 |
| 2019/0122096 A1* | 4/2019 | Husain | G06F 11/3495 |

OTHER PUBLICATIONS

Snyder et al: "X-Vectors: Robust DNN Embeddings for Speaker Recognition"; Center for Language and Speech Processing & Human Language Technology Center of Excellence, The Johns Hopkins University, Baltimore, MD : (http://www.danielpovey.com/files/2018_icassp_xvectors.pdf).

Li et al: Deep Speaker: an End-to-End Neural Speaker Embedding System, May 5, 2017 (https://arxiv.org/abs/1705.02304).

\* cited by examiner

SPEAKER RECOGNITION

CROSS-REFERENCE TO RELATED APPLICATIONS

This application claims priority to UK Application No. GB 1808118.2, filed May 18, 2018, under 35 U.S.C. § 119(a). The above-referenced patent application is incorporated by reference in its entirety.

BACKGROUND OF THE INVENTION

Field of the Invention

The present invention relates to speaker recognition.

Description of the Related Technology

Speaker recognition, also referred to as voice recognition or speaker classification, relates to the task of determining an identity of a user based on the user's voice. Speaker recognition may be used, for example, to verify a user's identity.

Speaker recognition is different from speech recognition, which relates to recognizing what is being said, rather than who has said it. Speaker recognition is also different from authentication, although speaker recognition may be used for authentication or verification purposes. There is also a difference between speaker recognition and speaker diarisation; the latter relates to recognizing when the same speaker is speaking, rather than recognizing who is speaking.

Speaker recognition may be divided into two categories: text-dependent and text-independent speaker recognition. Text-dependent speaker recognition uses a fixed or predetermined passphrase uttered during enrolment and during subsequent identification of the speaker where the speaker has to utter the same passphrase used during enrolment. Text-independent speaker recognition, on the other hand, is not constrained by the content of utterances made by the speaker following enrolment. Text-independent speaker recognition may be used in systems which pro-actively detect speakers. For example, speakers may be detected while they are conducting spontaneous dialogue acts, rather than speaking predetermined passphrases as in the case of text-dependent speaker recognition.

Computer-implemented models or functions can be used to perform automatic speaker recognition. I-vectors are an example of such a model. Variability in speech, including speaker and channel variation, may be modelled in a total variability space. Using factor analysis, acoustic features may be projected to a low-dimensional space, as so-called I-vectors. A backend classifier such as a support vector machine (SVM) or probabilistic linear discriminant analysis (PLDA) may then be used to recognize speakers using the generated I-vectors. A drawback of the I-vector approach is that it requires training of multiple components with different objectives, typically from scratch. Further, it may be difficult to adapt an I-vector system across domains and channels, let alone across different speech technology tasks, thereby limiting its scalability. Moreover, the accuracy of I-vector-based speaker recognition systems may decrease when relatively short vocal utterances are used.

Recent research has proposed the use of artificial neural networks (ANNs) to perform speaker recognition. In some speaker recognition scenarios, trained ANNs have been shown to offer similar or improved accuracy relative to I-vector systems. However, there is a perception that the use of ANNs trained to perform speaker recognition has drawbacks. For example, there is a perception that the use of such ANNs may be relatively processor-intensive, may require complex and/or expensive hardware to implement, and/or may require a relatively large amount of storage. Due to the associated processing complexity and/or hardware requirements, there is a perception that performing automatic speaker recognition using trained ANNs may also be a relatively slow process.

SUMMARY

According to a first aspect of the present invention, there is provided a speaker recognition system comprising: at least one microphone operable to output data representing speech of a speaker; and a controller operable to: receive the data output from the at least one microphone; process the received data using a first artificial neural network to obtain first output data, the first artificial neural network having been trained based on outputs of a second artificial neural network, the second artificial neural network having been trained to perform speaker recognition; and identify the speaker using the first output data, wherein the first artificial neural network comprises fewer layers and/or fewer parameters than the second artificial neural network, and wherein the first artificial neural network is configured to emulate a result derivable using an output of the second artificial neural network.

According to a second aspect of the present invention, there is provided a computer-implemented method for performing speaker recognition, the method comprising: receiving data from at least one microphone, the data representing speech of a speaker; processing the received data using a first artificial neural network to obtain first output data, the first artificial neural network having been trained based on outputs of a second artificial neural network, the second artificial neural network having been trained to perform speaker recognition; and identifying the speaker using the first output data, wherein the first artificial neural network comprises fewer layers and/or fewer parameters than the second artificial neural network, and wherein the first artificial neural network is configured to emulate a result derivable using an output of the second artificial neural network.

According to a third aspect of the present invention, there is provided a method for performing speaker recognition, the method comprising: receiving first data representing a first portion of an utterance of a speaker; processing the first data using an artificial neural network to obtain first output data; receiving second data representing a second portion of the utterance, the second portion having been uttered after the first portion; processing the second data using the artificial neural network to obtain second output data; and using the first output data and the second output data to identify the speaker of the utterance, wherein the processing the first data begins before the second data is received in full.

According to a fourth aspect of the present invention, there is provided a method of configuring an artificial neural network, comprising: training a first neural network to be used in speaker recognition; extracting an embedding vector from the first neural network, the embedding vector being an intermediate output of the first neural network; and using the extracted embedding vector as a target for training a second, smaller neural network.

According to a fifth aspect of the present invention, there is provided a method of performing speaker recognition, comprising: receiving audio data representing a human voice; and using data based on the received audio data and a first model that has been obtained from a second model using knowledge distillation to perform text-independent speaker recognition in relation to the received audio data.

According to a sixth aspect of the present invention, there is provided a method of performing speaker recognition, comprising: receiving sound from a human via a microphone; and using (a) data based on the received sound and (b) a first artificial neural network whose output emulates an intermediate layer of a second, larger neural network to recognize said human.

According to a seventh aspect of the present invention, there is provided a computer program comprising instructions which, when executed, cause a system to perform a method according to any of the second, third, fourth, fifth or sixth aspects of the present invention.

According to an eighth aspect of the present invention, there is provided a system configured to perform speaker recognition using at least one student artificial neural network, the at least one student artificial neural network having been trained to emulate an output of at least one teacher artificial neural network.

According to a ninth aspect of the present invention, there is provided a speaker recognition system comprising: at least one microphone operable to output data representing an utterance of a speaker; and a controller operable to: receive the data output from the at least one microphone; process the received data using a first artificial neural network to obtain first output data; process the received data using a second artificial neural network to obtain second output data, the first and the second artificial neural networks each having been trained to perform speaker recognition; and identify the speaker of the utterance using the first output data and the second output data, wherein the first artificial neural network and the second artificial neural network have different architectures and/or have been trained using different objective functions.

Further features and advantages will become apparent from the following description, given by way of example only, which is made with reference to the accompanying drawings.

DETAILED DESCRIPTION OF CERTAIN INVENTIVE EMBODIMENTS

Figure 1:
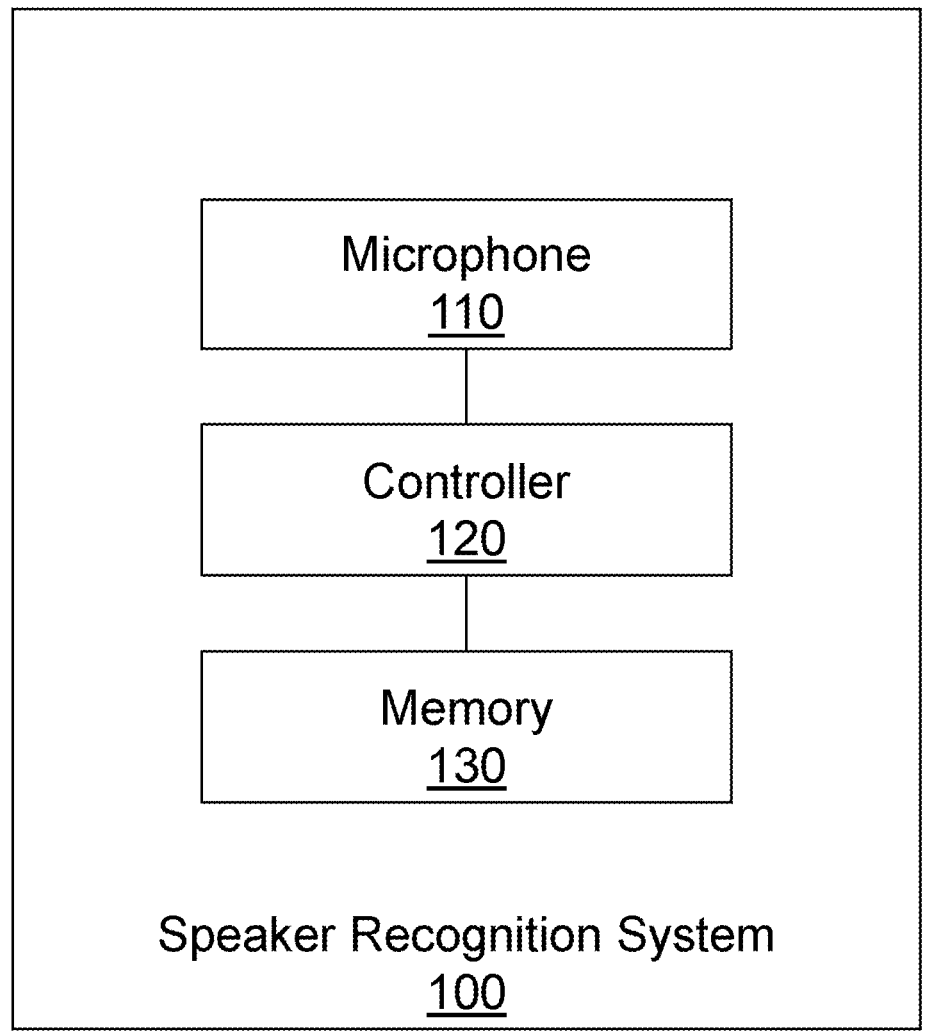
FIG. 1 shows a schematic block diagram of an example of a speaker recognition system in accordance with an embodiment of the present invention.

Referring to FIG. 1, there is shown schematically an example of a speaker recognition system 100. The speaker recognition system 100 may be comprised in an electronic device. In some examples, the speaker recognition system 100 is comprised in an interactive device, that is, a device with which a user may interact. For example, the speaker recognition system 100 may be comprised in a robot. A robot may be considered to be a guided agent. A robot may be guided by one or more computer programs and/or electronic circuitry. A robot may be guided by an external control device or the control may be embedded within the robot. A robot may be configured to interact with humans and/or an environment. A robot may or may not be configured to move. A robot may be considered to be a smart device. In some examples, the speaker recognition system 100 is comprised in a digital home assistant. In some examples, the speaker recognition system 100 is comprised in an in-car human-computer interface system. In some examples, the speaker recognition system 100 is comprised in a mobile device. The speaker recognition system 100 may be comprised in an embedded device. The speaker recognition system 100 may be comprised in a device having a relatively small form factor and/or a relatively small physical size. The speaker recognition system 100 may be comprised in a device having a relatively low power consumption, processing capability and/or amount of on-board storage.

In this example, the speaker recognition system 100 comprises at least one microphone 110, a controller 120 and a memory 130. The memory 130 may comprise volatile and/or non-volatile memory. The memory 130 may comprise a hard disk drive and/or or a solid state drive. In some other examples, the speaker recognition system 100 does not comprise a memory.

In some examples, the at least one microphone 110 comprises an array of microphones. An array of microphones may be an arrangement of multiple microphones operating in tandem. In examples where the at least one microphone 110 comprises an array of microphones, the controller 120 may be configured to process received sounds using a beamforming function of the controller 120 using the array of microphones. The beamforming function may comprise one or more spatial filters to be applied to sounds received at the array of microphones. The array of microphones may be configured to be more sensitive to sounds arriving from particular directions based on the beamforming function. The beamforming function may be used to adjust or configure a beam direction of the array of microphones. The beam direction may be considered to be a sensitivity pattern of the array of microphones. The use of the beamforming function may facilitate a more accurate processing of received acoustic signals. The beamforming function may be a delay sum beamforming function, although other beamforming functions may also be used.

The at least one microphone 110 is operable to output data representing speech of a speaker. The at least one microphone 110 may be configured to receive a sound from the environment of the at least one microphone 110, the sound corresponding to the speech of the speaker, and to convert the received sound into an electrical signal. The electrical signal may be transmitted by the at least one microphone 110, e.g. via an electrical wire or cable. The electrical signal may represent and/or be useable to derive data representing the speech of the speaker. The data output by the at least one microphone 110 may comprise audio data indicative of one or more characteristics of the received sound, for example.

In some examples, the at least one microphone 110, controller 120 and memory 130 are physically connected together as a standalone integrated device. The components may also be connected by internet cables or wireless transmission links. In such cases the memory 130 may be partly or fully located in a cloud network, and the speaker recognition system 100 may form a client-server application.

The speech may comprise one or more utterances. An utterance may comprise one or more of a syllable, word, phrase, sentence or statement spoken by the speaker. An utterance may be considered a vocal noise generated by the speaker. The speech may be at least 2 seconds in duration. In some examples, the speech is less than 10 seconds in duration. Such speech may be considered a "short utterance". In some examples, the speech is less than 5 seconds in duration. Such speech may be considered an "ultra-short utterance". Performing speaker recognition based on such short or ultra-short utterances may reduce a latency associated with speaker recognition, and may consequently facilitate more natural user interactions. Further, using short or ultra-short utterances may enable speaker enrolment and/or recognition to be performed without the speaker having to recite lengthy statements or dialogues.

The controller 120 may be a processor. The controller 120 can include a microprocessor, microcontroller, processor module or subsystem, programmable integrated circuit, programmable gate array, or another control or computing device.

The controller 120 is communicatively coupled to the at least one microphone 110 and the memory 130. The controller 120 may be coupled to the at least one microphone 110 and the memory 130 via one or more wires and/or electrical connections. In some examples, the controller 120 is coupled to the at least one microphone 110 and the memory 130 via a wireless connection.

In this example, the controller 120 is operable to receive the data representing the speech of the speaker from the at least one microphone 110.

The controller 120 is operable to process the received data using a first artificial neural network (ANN) to obtain first output data. ANN refers herein to neural networks having any arbitrary architecture, network size or depths. The controller 120 is further operable to identify the speaker using the first output data.

Using an ANN to perform speaker recognition may increase an accuracy and/or reliability of speaker recognition compared to some known techniques. Accuracy and/or reliability may be further increased for text-independent speaker recognition, and in scenarios where speaker recognition is based on short utterances. Neural network-based speaker recognition may be more resilient to potential performance degradation as the length of utterances used for enrolment and recognition decreases, compared to I-vector systems. Further, end-to-end training may be more readily employed through the use of ANNs compared to techniques which do not use ANNs.

Before being used to obtain the first output data, the first ANN is trained based on outputs of a second ANN, the second ANN having been trained to perform speaker recognition. The first ANN comprises fewer layers and/or fewer parameters than the second ANN. As such, the first ANN may be smaller and/or less complex than the second ANN.

The first ANN is configured to emulate a result that is derivable using an output of the second ANN. In some examples, the first ANN is configured to emulate the output of the second ANN itself, that is, the direct output of the second ANN. In other examples, the first ANN is configured not to emulate the output of the second ANN itself, but a result derived therefrom. For example, the second ANN and a further ANN may both be used to train the first ANN. In such an example, the first ANN may be configured to emulate a combined or averaged output of the second ANN and the further ANN, or any other function of the output of the second ANN and the further ANN. In some examples, the first ANN is configured to emulate an expected output of the second ANN. The expected output may be an output that the second ANN would be expected to produce, given a particular input, namely the received data from the at least one microphone 110. The expected output may not be an actual output, that is the second ANN may never actually produce the output that the first ANN is configured to emulate. The expected output may not be the same as the output that would be produced by the second ANN.

The first ANN may comprise a student ANN. The second ANN may comprise a teacher ANN. As described further below, knowledge obtained by the teacher ANN may be transferred, or "distilled", to the student ANN, to enable the student ANN to accurately mimic the outputs of the larger, teacher ANN. As such, teacher-student neural network training may be used in a speaker recognition system. The second ANN may be a relatively large-scale ANN compared to the first ANN. The first ANN may be a relatively small-scale ANN compared to the second ANN. In some examples, the first ANN is 60-95% smaller than the second ANN. In some examples, the first ANN is obtained by compressing the second ANN using a knowledge distillation technique. The first ANN may be considered to be a "compressed" version of the second ANN.

Using a first ANN that has been trained based on outputs of a second, larger ANN trained to perform speaker recognition facilitates a reduction in processing requirements, storage, latency and/or hardware requirements compared to a case in which the second ANN is itself used to identify the speaker. In cases where the ANN to be used is stored in the speaker recognition system, using the first, smaller ANN instead of the second, larger ANN allows embedded devices such as robots, or mobile devices, to perform speaker recognition despite having limited storage space, power, hardware and/or processing capabilities. Such devices may not be capable of storing and/or using the second ANN to perform speaker recognition. Therefore, certain examples described herein allow such low-power, low-storage devices to be provided with speaker recognition functionality. Providing such devices with on-board speaker recognition functionality reduces a need to transmit audio data to a remote location for processing. Thus privacy of such systems may be increased. Further, providing such devices with on-board speaker recognition functionality enhances the scalability of the system to support distributed user groups. Moreover, the use of the second ANN to perform speaker recognition by such devices may involve an undesirable amount of latency due to the size and/or complexity of the second ANN. By decreasing latency in performing speaker recognition, a user experience may be improved, since the speaker recognition system appears more responsive to the user. In some examples, latency is kept under 150 milliseconds (ms) when the first ANN is deployed in a low-power embedded quad-core device working in oversubscription mode (where the number of running processes in the system is higher than the total number of available computing cores).

Further, using a first ANN that has been trained to emulate a result derivable from the output of a second, larger ANN facilitates an increase in speaker recognition accuracy and/or reliability compared to a case in which the first ANN is trained to perform speaker recognition directly, rather than based on outputs of an already-trained, larger ANN. The accuracy and/or reliability of neural network outputs may be dependent on the number of layers and/or the number of parameters in each layer of the neural network. Therefore, the second, larger ANN may be more accurate and/or reliable at performing speaker recognition than a smaller ANN would be, if the smaller ANN were not trained to emulate the outputs of the larger ANN. In some cases, the second ANN is more accurate and/or reliable at performing speaker recognition than the first ANN is, even when the first ANN is trained to emulate the outputs of the second ANN. However, such a reduction in accuracy and/or reliability may be acceptable in order to achieve the reduction in processing, storage and/or power requirements that is obtained through use of the first, smaller ANN. Further, such a reduction in accuracy and/or reliability may be less than would be the case if the first ANN were not trained based on the outputs of the second ANN.

Using teacher-student knowledge distillation of ANNs is surprisingly effective for speaker recognition. There has been a bias against using ANNs for speaker recognition, due for example to a perception that the use of ANNs may be relatively processor-intensive, may require complex and/or expensive hardware to implement, may require a relatively large amount of storage, and/or may be a relatively slow process. It has been found that teacher-student knowledge distillation is surprisingly effective particularly in cases where memory, latency, power, etc. are primary considerations, albeit potentially at the cost of accuracy compared to a case in which an uncompressed ANN is used.

In some examples, the first ANN is stored in the memory 130. As such, the first ANN may be stored "on board" the speaker recognition system 100. In other examples, the first ANN is not stored in the memory 130. For example, the first ANN may be stored in a network element and/or a remote device communicatively coupled to the speaker recognition system 100 via one or more networks.

In some examples, the second ANN is not stored in the speaker recognition system 100. The second ANN may be stored remotely relative to the speaker recognition system 100. As such, the speaker recognition system 100 may comprise the first ANN only out of the first ANN and the second ANN. By not storing the second ANN in the speaker recognition system 100, e.g. in the memory 130, an amount of storage space required in the speaker recognition system 100 may be reduced.

In some examples, the controller 120 is configured to transmit a control signal to control operation of a device in the environment around the speaker recognition system 100 dependent on the identifying of the speaker. The control signal may comprise an electrical signal operable to control one or more operations, components and/or functions of the device. The control signal may be transmitted to the device itself, or may be transmitted to another entity that in turn controls the device. The control signal may be transmitted when the device is in the vicinity of the speaker recognition system 100 or when the device is not in the vicinity of the speaker recognition system 100. In an example, the control signal is operable to change an operating state of the device. Changing the operating state may involve activating or deactivating the device.

In some examples, the controller 120 identifies the device to be controlled based on the identifying of the speaker. Different speakers may be associated with different controllable devices. For example, the speaker recognition system 100 may receive a voice command to "turn on my reading light" or "set the radio to my favorite station". In this case, the speaker recognition system 100 may identify which light to turn on, or which radio station to tune to, based on the identification of the speaker. In one example, the speaker may say "I am really warm today". The speaker recognition system 100 may, based on the identification of the speaker, determine what the speaker's preferred temperature is, and control a thermostat device accordingly. In another example, for example where the speaker recognition system 100 is comprised in an in-car human-computer interface system, the speaker recognition system 100 could receive a command to "turn the temperature up on my heated seat". The speaker recognition system 100 knows which temperature is the speaker's preferred temperature, so can adjust the heated seat accordingly depending on the identity of the speaker. Other types of device control may be performed in other examples.

In some examples, the controller 120 is configured to transmit a query to a remote server based on the identity of the speaker. In some examples, the controller 120 is configured to access one or more resources and/or to grant the speaker access to one or more resources on the basis of the identity of the speaker.

In some examples, the first ANN has been trained based on embedding vectors, as will be described in more detail below. The embedding vectors may be generated by the second ANN, e.g. during training of the second ANN to perform speaker recognition. The embedding vectors may be generated by an intermediate layer of the second ANN. In other words, the embedding vectors may be generated by a layer other than the final layer of the second ANN. In some examples, the embedding vectors have a higher dimensionality than the output of the final layer of the second ANN. The embedding vectors generated by the second ANN may be used as an input for training the first ANN, in order to train the first ANN to emulate the results of the second ANN, as will be described in more detail below. Embedding vectors extracted from an intermediate layer of the second ANN may be a more reliable training target for the first ANN than an output from the final layer of the second ANN. As such, using embedding vectors as training targets for the first ANN may result in the first ANN having a greater speaker recognition accuracy than using other data as training targets. Moreover, embedding vectors generated by an ANN may be re-used in other tasks, enabling multi-task learning and performance. For example, the generated embedding vectors may be applicable in tasks such as voice trigger, speech recognition, psychometric analysis, user profiling and emotion recognition.

In some examples, the speaker recognition system 100 is configured to perform text-independent speaker recognition. Text-independent speaker recognition is speaker recognition which does not rely on a predetermined or fixed passphrase to be uttered. Instead, in text-independent speaker recognition, speakers may be recognized regardless of the content of their speech. Therefore, a user may not be required to remember and recite a particular passphrase in order to interact with the speaker recognition system 100 post-enrolment. Further, the speaker recognition system 100 may be able to recognize the speaker without the speaker having to interact with the speaker recognition system 100 directly. For example, the speaker may be speaking with one or more other people, or may be speaking on the telephone, and the speaker recognition system 100 is able to recognize the speaker based on such unconstrained and/or spontaneous speech despite the speech not being directed at, or adapted to, the speaker recognition system 100. In other words, speaker recognition may be performed pro-actively by the speaker recognition system 100. Thus an amount of user burden may be reduced, and a user experience may be improved.

Distilling the knowledge of a teacher neural network to a student neural network (referred to herein as "model compression") is a challenging task for text-independent speaker recognition. The teacher network is trained to learn particular targets (e.g. a binary label representing speaker identity). In knowledge distillation, a student network such as an autoencoder is used to learn a fine-grained continuous target. Unlike the continuous targets in speech recognition, the continuous targets in speaker recognition are not closely correlated with the end task of labelling speakers. This makes it difficult to guarantee the reliability of the learning targets for the student network and thus makes the task of model compression difficult. Training data sets, neural network architectures, objective functions and/or activation functions may be adjusted in order to optimize the accuracy of the small-scale, student network. For example, the activation function of the teacher neural network affects the dynamic range of the output of the teacher neural network, which in turn affects the accuracy of the student neural network's predictions. Examples of neural network architectures and functions will now be described. It will be understood that other types of network architecture and function may be used in other examples, and may be optimized for different tasks, e.g. for text-dependent speaker recognition.

Figure 2:
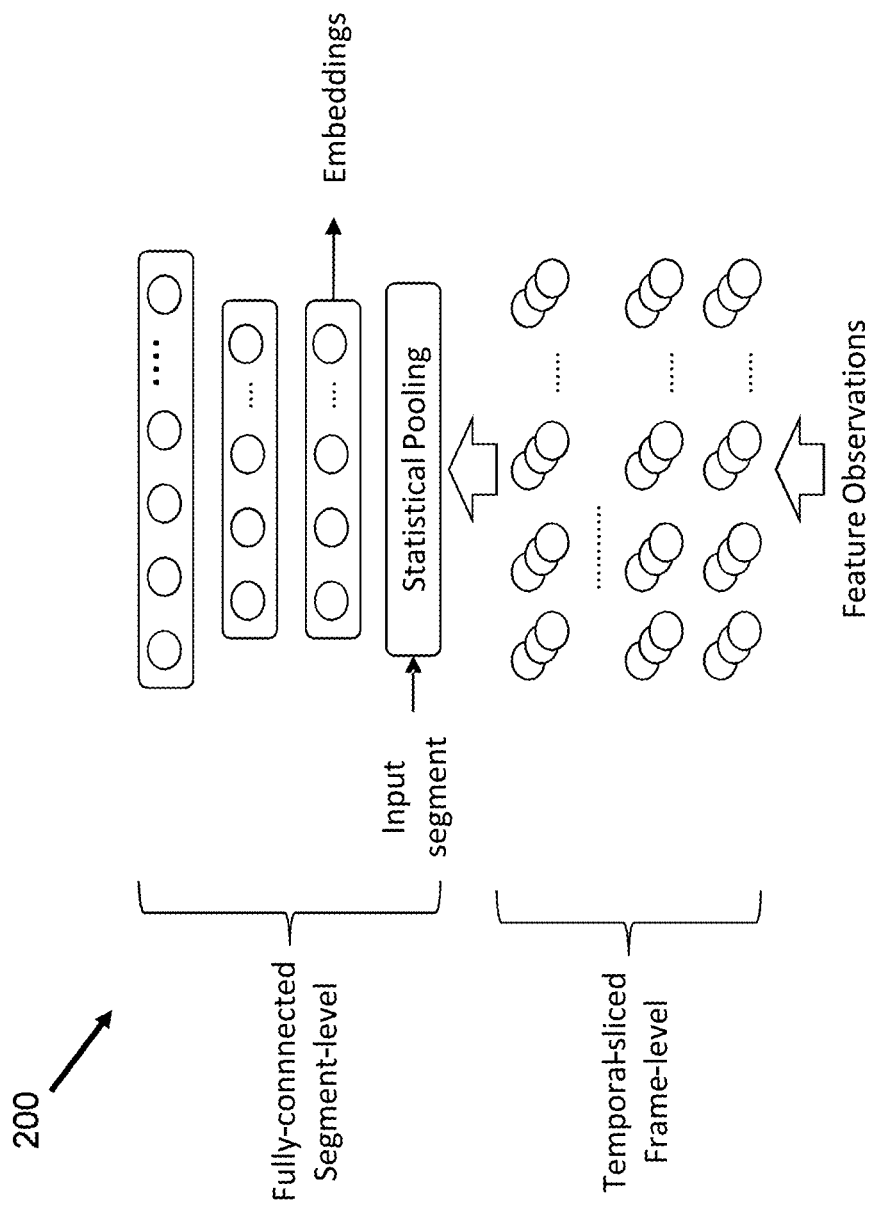
FIG. 2 shows a schematic diagram of an example of an artificial neural network.

Referring to FIG. 2, there is shown schematically an example of a teacher neural network 200. In this example, the teacher neural network 200 has an x-vector (or "X-vec") deep neural network (DNN) architecture. In the X-vec architecture, input acoustic observation features are fed into an 8-layer refined time-delay neural network (TDNN) classifier. A time-delay neural network is a multilayer artificial neural network which is able to classify patterns with shift-invariance and/or model context at each layer of the network. The first five layers of the network 200 operate at frame-level and are fully-connected. Each layer receives the temporally-spliced input from the previous layer. Thus the length of the text window increases with the depth of the network. The sixth layer is a statistical pooling layer, which converts the frame-level information output by its former layer to sentence-level in terms of mean and variance. Two more fully connected layers are then added before a final log-softmax activation layer. The output of the network has S neurons, indicating the posterior probability of the hypothesized speakers with respect to feature observations. The architecture can be regarded as an S-way speaker identification network, where S is the number of target speakers in the training set. The network is trained using a cross-entropy (CE) objective. After training, the X-vec embeddings which store the hypothesis are extracted from the output at the first fully connected layer immediately after the statistical pooling layer. Such embeddings may be represented by $H_{xv}(x_p)$ and may be used to train a student neural network, as will be described in more detail below.

Figure 3:
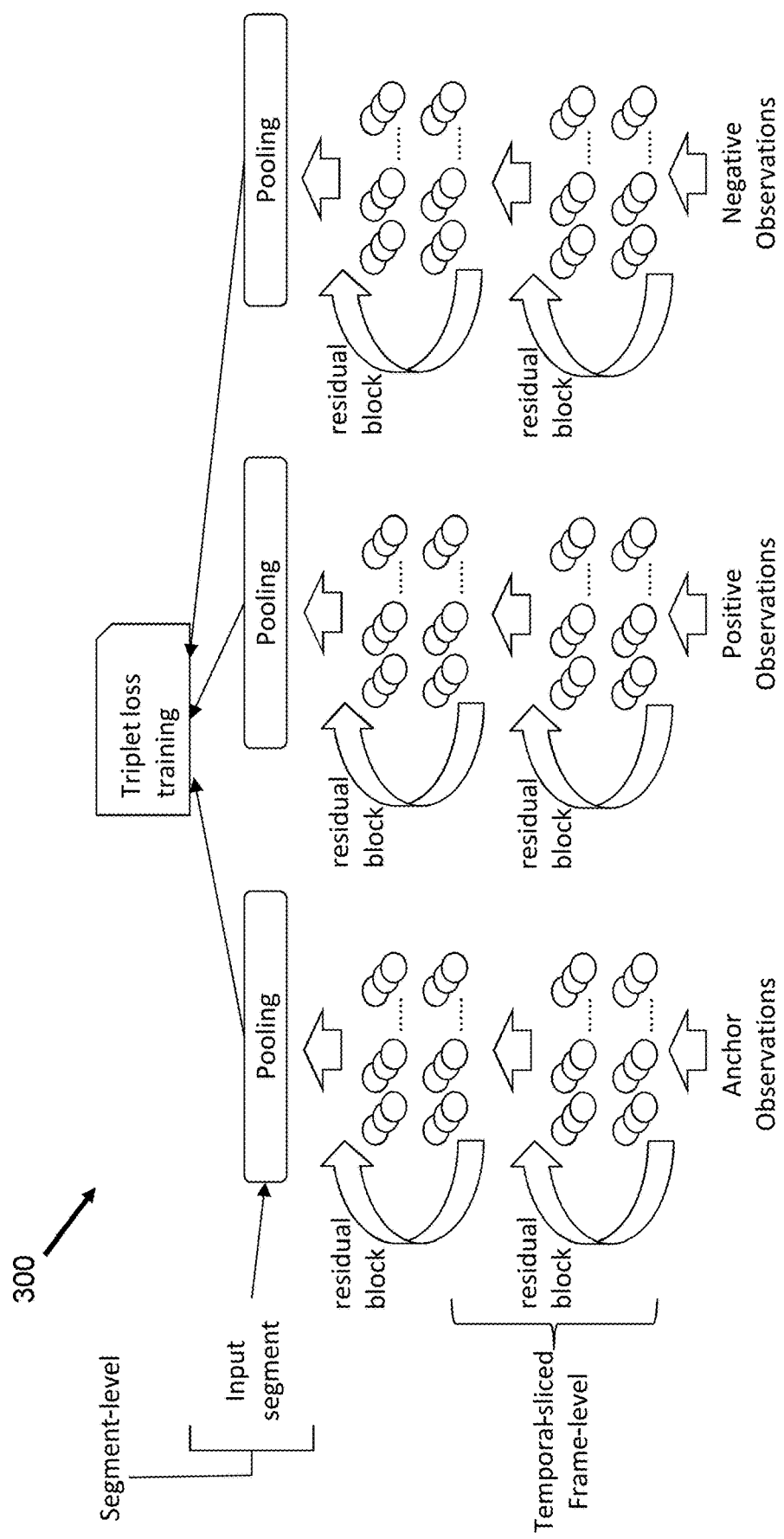
FIG. 3 shows a schematic diagram of another example of an artificial neural network.

Referring to FIG. 3, there is shown schematically another example of a teacher neural network 300. In this example, the teacher neural network 300 has a resnet-vector (or "Resnet-vec") DNN architecture. The Resnet-vec architecture follows a deep residual convolutional neural network (CNN) architecture. A convolutional neural network is a type of deep, feed-forward artificial neural network. A convolutional neural network may comprise convolution layers and pool layers. A convolutional neural network may provide higher accuracy than other types of neural network. In this setting, the neural network is trained on fixed-duration speech snippets. Mel-frequency cepstral coefficient features are extracted and a two-dimensional (2D) time-frequency representation of features is constructed. The temporal-spectral features are passed to blocks of residual CNNs (ResCNN). Each of the ResCNN blocks comprises two convolutional layers, each convolutional layer being followed by a rectified linear unit (ReLU) activation with batch normalization. A highway or shortcut connection performs identity mapping from the beginning of the block to its penultimate layer.

In this example, eight residual blocks are stacked together to form the deep ResCNN structure. The filter size and stride may vary between different residual blocks. After passing through the eight blocks, the output from all of the feature maps are stacked together and passed to a statistical layer. The statistical layer learns the sentence-level mean and variance statistics from the fixed-duration speech snippets. The statistical layer is followed by a fully-connected layer and a length normalization layer.

In this example, the training of the residual CNN follows a triplet loss criterion. In each training batch, three utterances, $x^a$, $x^+$ and $x^-$ are considered. $x^a$ is an anchor utterance, and $x^+$ and $x^-$ are positive and negative examples respectively. Triplet loss training tries to minimize the loss in which the similarity of $x^a$ with $x^-$ is larger than that with $x^+$. Triplet loss, L, may be represented by: $L = \max(\text{sim}(x^a, x^-) - \text{sim}(x^a, x^+))$.

One or both of the X-vec and the Resnet-vec neural network architectures described above with reference to FIGS. 2 and 3 may be used as a teacher neural network from which knowledge may be distilled into a smaller, student neural network. Student training is a mechanism which distils knowledge from a deep or complex network (the "teacher" network) into a smaller or less complex one (the "student" network). A teacher network, e.g. with softmax output, may first be trained using a criterion such as cross entropy. The knowledge from the teacher network is then extracted and transferred to the student network. This may be implemented by learning a soft target distribution based on a transfer data set. This target distribution may reflect the true objective as well as the generalization power acquired by the teacher network(s). The transfer data set may or may not coincide with the training data set used to train the teacher network(s).

Teacher neural networks may be trained using one or more data sets comprising data from one or more speech corpuses. These data reflect read and spontaneous speech from a large number of speakers with various acoustic channel conditions. The training data may be representative of real speech and may be sufficiently diverse to prevent overtraining and/or overfitting. In some cases, the data set used for training is modified to simulate babble noise, music noise, additive noise and/or reverberation. Additionally or alternatively, the training data may contain real noise, reverberation, intra-speaker variability and/or compression artefacts. The training data set may comprise out-of-domain data and/or in-domain data.

Training of the teacher network(s) may be performed on a graphics processing unit (GPU). The GPU may comprise a greater number of cores than a central processing unit (CPU). The relatively large number of cores in the GPU enables certain computational tasks, for example tasks with a relatively high degree of parallelism, to be performed more efficiently by a GPU than by a CPU. In some examples, training of the teacher network(s) is performed "offline", e.g. before a speaker recognition system is deployed for use.

The teacher network(s) rely on advanced neural architectures to extract sentence- or utterance-level embedding information, which may be represented as vectors. Let $x_p=[x_0, x_1, \ldots, x_{N_p}]$ represent the feature vector of a sentence p with a length of $N_p$ frames. Embedding vectors may comprise utterance-level statistics. Embedding vectors $H_{xv}(x_p)$ and $H_{rv}(x_p)$ are fixed-length representations of $x_p$ derived by a set of non-linear transformations produced by a neural network. xv and rv denote the X-vec and the Resnet-vec network architectures, respectively. The speaker discrimination power of the embedding vectors may be calculated based on the pairwise cosine distance between the embedding vectors for different utterances. In some examples, PLDA classifiers are trained based on the embedding vectors to derive speaker recognition power. The student network may be trained subject to a minimum mean square error between predicted targets generated by the student network and the embedding vectors output by the teacher network(s), e.g. $H_{xv}(x_p)$ or $H_{rv}(x_p)$.

Embedding vectors may have a higher entropy than softmax or final layer outputs. Embedding vectors are high-level quantitative representations of speaker characteristics. Training of the student network captures both the target speaker distribution and the generalization power. This is analogous to using logits before the softmax activation in a classification network. Knowledge distillation may consider the features (input) and the embedding vectors (output) of the teacher network only, and thus is agnostic to the network structure and training criteria of the teacher network. As such, a student network may learn from both the X-vec network, which has a first structure (e.g. TDNN) and is trained using a first objective function (e.g. cross entropy), and the Resnet-vec network, which has a second, different structure (e.g. ResCNN) and is trained using a second, different objective function (e.g. triplet loss). Alternatively, each teacher network may distil knowledge into a corresponding, separate, student network.

Figure 4:
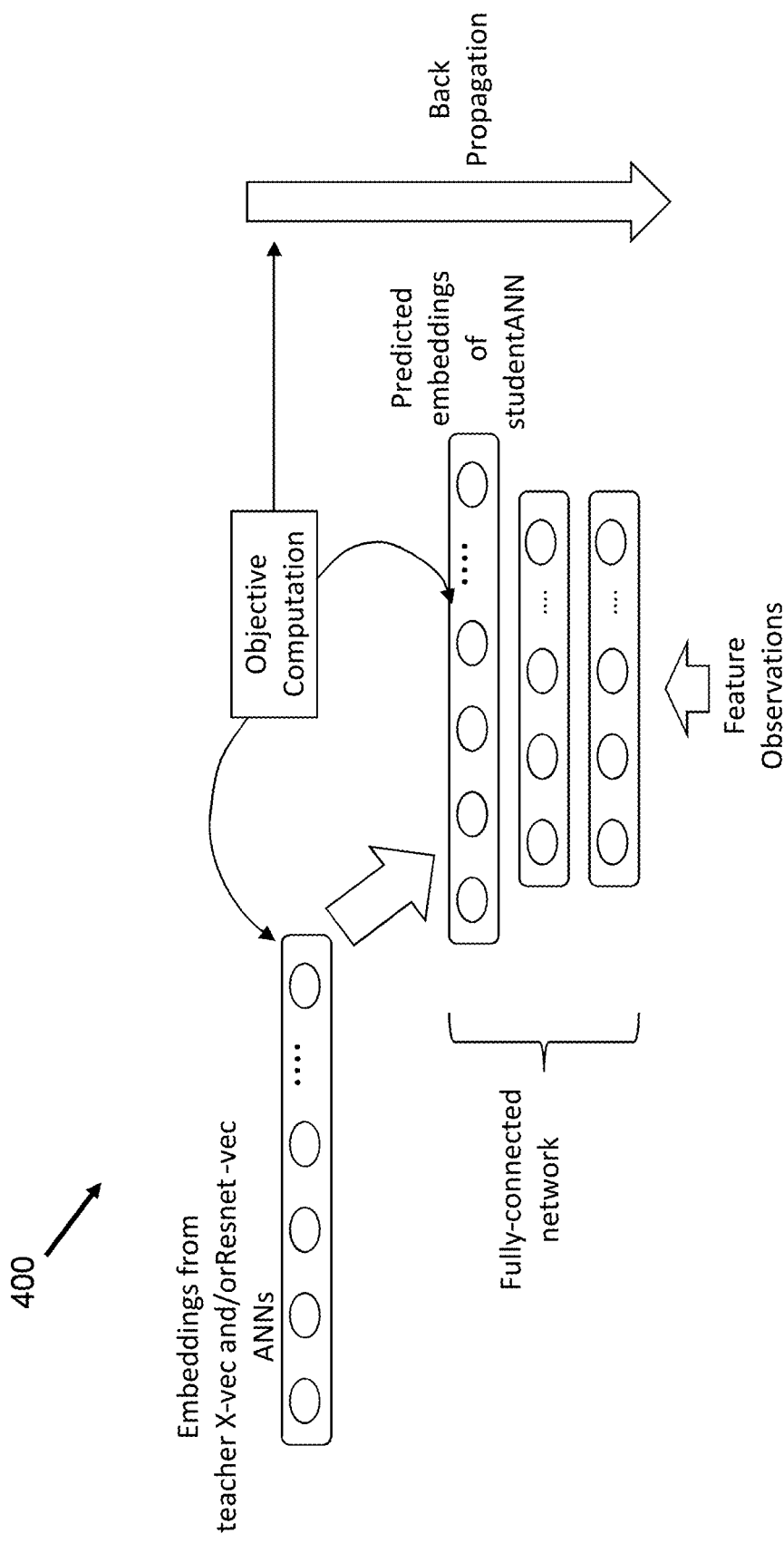
FIG. 4 shows a schematic diagram of an example of an artificial neural network in accordance with an embodiment of the present invention.

Referring to FIG. 4, there is shown schematically an example of a student neural network 400.

The student neural network 400 may comprise an autoencoder. An autoencoder is an ANN used for unsupervised learning of efficient codings. In this example, the student neural network 400 comprises a 2-layer 512-by-512 fully-connected autoencoder. Different numbers of layers and/or parameters may be used in other examples. In this example, the student neural network 400 is trained subject to the minimum square error between the frame-wise predicted embedding vectors generated by the student neural network 400 and the actual embedding vectors received from one or more teacher neural networks. The one or more teacher neural networks may comprise one or both of the X-vec and the Resnet-vec ANNs described with reference to FIGS. 2 and 3, respectively. Back propagation may be used to calculate a gradient for adjusting weights to be used in the student neural network 400. During training of the student neural network 400, frame-wise targets are generated by repeating the embedding vectors n times, where n is the number of frames in the utterance. During inference, the student neural network 400 is used to predict an embedding vector in every frame, and the output is averaged across an utterance. The training dataset used for training the student neural network 400 may be the same as the training dataset used for training the one or more teacher neural networks. In some examples, the training dataset used for training the student neural network 400 is not the same as the training dataset used for training the one or more teacher neural networks.

Figure 5:
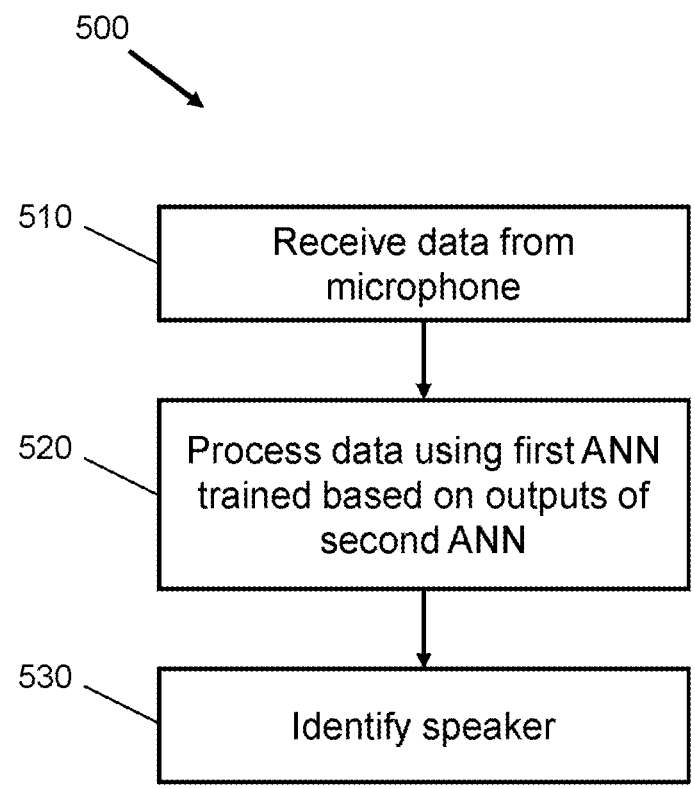
FIG. 5 is a flow diagram depicting an example of a method in accordance with an embodiment of the present invention.

Referring to FIG. 5, there is shown an example of a method 500 for performing speaker recognition. The method 500 may be performed by one or more components of a speaker recognition system such as the speaker recognition system 100 described above. For example, the method 500 may be performed by the controller 120. In an example, at least one portion of the method 500 is implemented by executable code, stored on a non-transitory storage medium, that includes instructions, that when executed by at least one processor, causes the at least one processor to perform the at least one portion of the method 500 described herein. In another case, at least one portion of the method 500 is implemented by at least one ASIC.

At item 510, data is received from at least one microphone. The received data represents speech of a speaker.

At item 520, the received data is processed using a first ANN to obtain first output data. The first ANN has been trained based on outputs of a second ANN. The second ANN has been trained to perform speaker recognition. The first ANN comprises fewer layers and/or fewer parameters than the second ANN. The first ANN is configured to emulate a result derivable using an output of the second ANN. As such, the first ANN may comprise a student ANN (e.g. the ANN 400 described above) and the second ANN may comprise a teacher ANN (e.g. the ANNs 200 and/or 300 described above).

In some examples, the processing at item 520 comprises using only the first ANN of the first ANN and the second ANN. Therefore, in such examples, the second ANN may not be used to process the received data. Since the first ANN comprises fewer layers and/or fewer parameters than the second ANN, using only the first ANN reduces an amount of processing, storage, power and/or time required to perform speaker recognition compared to a case in which the second, larger ANN is used to perform speaker recognition.

In some examples, processing the received data comprises deriving a set of acoustic characteristics from the received data. The set of acoustic characteristics may comprise a set of mel-frequency cepstral coefficients. The mel-frequency cepstrum is a representation of the short-term power spectrum of a sound, based on a linear cosine transform of a log power spectrum on a nonlinear mel scale of frequency. The mel scale is a perceptual scale of pitches judged by listeners to be equal in distance from one another. Mel-frequency cepstral coefficients are coefficients that collectively make up the mel-frequency cepstrum. As such, deriving a set of mel-frequency cepstrum coefficients from the received data enables the extracted audio features to more closely match what humans perceive than may otherwise be the case. Other types of acoustic characteristics may be used in other examples. Examples include, but are not limited to, the magnitude of a non-linear mel-scale frequency. The derived set of acoustic characteristics may be input to the first ANN and used by the first ANN to obtain the first output data.

At item 530, the speaker is identified using the first output data. The first output data may comprise a statistical or probabilistic set of hypotheses having corresponding projected likelihoods. Speaker identification may be performed by selecting the hypothesis having the highest likelihood. The first output data may have a different format in other examples. For example, the first output data may comprise a binary or non-binary label denoting a particular speaker.

In some examples, the received data is processed using a third ANN to obtain second output data. Identifying the speaker may comprise using the second output data in addition to the first output data obtained using the first ANN. The third ANN may comprise a further student ANN. The third ANN is trained based on outputs of a fourth ANN. The fourth ANN may comprise a further teacher ANN. The fourth ANN has been trained to perform speaker recognition. The third ANN comprises fewer layers and/or fewer parameters than the fourth ANN. As such, the third ANN may be smaller and/or less complex than the fourth ANN. The third ANN is configured to emulate a result derivable using an output of the fourth ANN. Thus, two teacher ANNs may be used (namely the second and fourth ANNs), and the knowledge of each teacher ANN may be distilled into a corresponding student ANN (namely the first and third ANNs). In some examples, the first output data and the second output data (obtained using the first ANN and the third ANN, respectively) are combined. Combining the outputs of the two student ANNs may produce a more accurate speaker identification result than using only one of the first output data and the second output data. In some examples, more than two teacher ANNs and/or more than two student ANNs are used.

The second ANN and the fourth ANN (e.g. the two teacher ANNs) have different architectures and/or have been trained using different objective functions. In some examples, one of the second ANN and the fourth ANN has an X-vec architecture, as described with reference to FIG. 2 above, and the other of the second ANN and the fourth ANN has a Resnet-vec architecture, as described with reference to FIG. 3 above. In other examples, one or both of the second ANN and the fourth ANN have an architecture other than an X-vec and a Resnet-vec architecture. Using multiple teacher ANNs having different architectures and/or having been trained using different objective functions may increase an accuracy in the ultimate decisions made by a student ANN. Teacher ANNs having different architectures and/or having been trained using different objective functions to perform the same task, namely speaker recognition, may obtain different and overlapping knowledge, which may be pooled and transferred to the student ANN using knowledge distillation. Further, using a combination of teacher ANNs having different architectures and/or having been trained using different objective functions may achieve optimal accuracy for text-independent speech recognition.

In some examples, the second ANN is trained using one of a cross entropy objective function and a triplet loss objective function, and the fourth ANN is trained using the other of the cross entropy objective function and the triplet loss objective function. In other examples, one or both of the second ANN and the fourth ANN is trained using an objective function other than a cross entropy objective function and a triplet loss objective function.

In some examples, the knowledge of multiple teacher ANNs is distilled into a single student ANN. For example, the first ANN may be trained based on outputs of both the second ANN and the fourth ANN described above. In such examples, the first ANN may be trained to emulate a result that is based on outputs of both the second ANN and the fourth ANN. For example, the first ANN may be trained to emulate a result that corresponds to a combination or average of the expected outputs of the second ANN and the fourth ANN. In such examples, the first ANN comprises fewer layers and/or fewer parameters than the fourth ANN.

In some examples, prior to receiving the data at item 510, background data and/or enrolment data is received from the at least one microphone. Background data represents training speech of a large group of background speakers, which may or may not include the speaker. The enrolment data represents enrolment speech of the speaker. The first ANN may be trained to identify the speaker, using the enrolment data and/or the background data. In some examples, the received enrolment data is input to the first ANN, which derives an embedding vector corresponding to the enrolment data. The embedding vector may be used to subsequently recognize the speaker. The content of the enrolment speech may be different than the content of the speech represented by the data subsequently received at item 510. As such, text-independent speech recognition may be performed. In such cases, the first ANN is able to recognize the speaker regardless of the content of the speech uttered by the speaker. In some examples, the content of the enrolment speech is the same as the content of the subsequently uttered speech.

In some examples, statistical inference is carried out in an online, or "on the fly" manner Soft decisions may be output by the system on a frequent or continuous basis, once sufficient statistics are available. For example, processing of data representing a first portion of an utterance may begin before a second portion of the utterance is received, and a soft decision may be made in relation to speaker recognition before the utterance has been received and/or processed in full. The speaker recognition results may be updated in a frequent and/or continuous manner as more portions of the utterance are received and/or processed. As such, latency in performing speaker recognition may be reduced. In some cases, speaker recognition may be performed in substantially real time.

Figure 6:
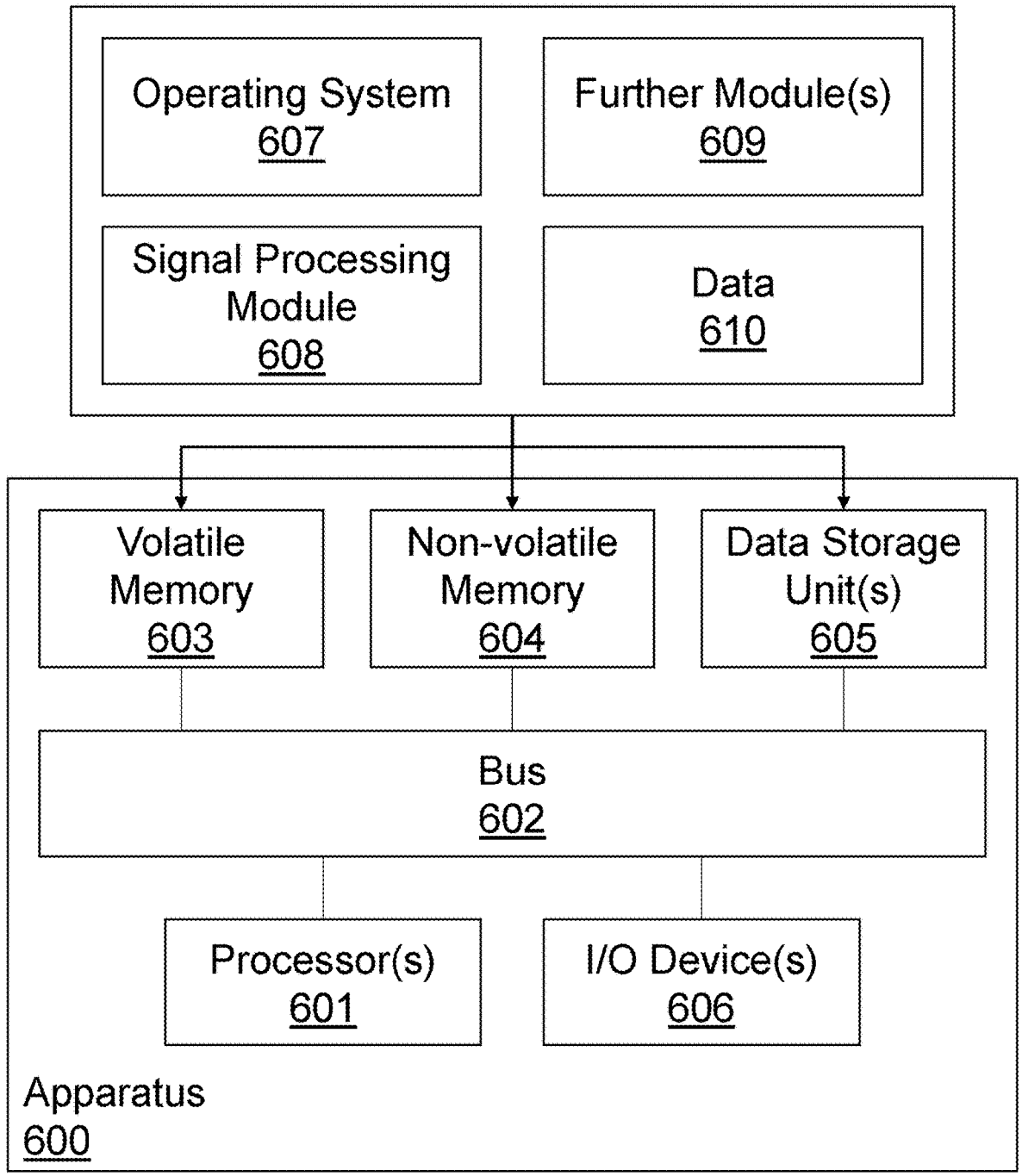
FIG. 6 shows a schematic block diagram of an example of an apparatus in accordance with an embodiment of the present invention.

Referring to FIG. 6, there is shown a schematic block diagram of an example of an apparatus 600.

In an example, the apparatus 600 comprises a speaker recognition system. In another example, the apparatus 600 comprises a robot.

Other examples of apparatus 600 include, but are not limited to, a mobile computer, a personal computer system, a smart speaker, a smart home device, a digital home assistant, an in-car human-computer interface system, a wireless device, phone device, desktop computer, laptop, notebook, netbook computer, mainframe computer system, handheld computer, a consumer electronics device such as a camera, camcorder, video game console, handheld video game device, or in general any type of computing or electronic device.

In this example, the apparatus 600 comprises one or more processors 601 configured to process information and/or instructions. The one or more processors 601 may comprise a central processing unit (CPU). The one or more processors 601 are coupled with a bus 602. Operations performed by the one or more processors 601 may be carried out by hardware and/or software. The one or more processors 601 may comprise multiple co-located processors or multiple disparately located processors.

In this example, the apparatus 600 comprises computer-useable volatile memory 603 configured to store information and/or instructions for the one or more processors 601. The computer-useable volatile memory 603 is coupled with the bus 602. The computer-useable volatile memory 603 may comprise random access memory (RAM).

In this example, the apparatus 600 comprises computer-useable non-volatile memory 604 configured to store information and/or instructions for the one or more processors 601. The computer-useable non-volatile memory 604 is coupled with the bus 602. The computer-useable non-volatile memory 604 may comprise read-only memory (ROM).

In this example, the apparatus 600 comprises one or more data-storage units 605 configured to store information and/or instructions. The one or more data-storage units 605 are coupled with the bus 602. The one or more data-storage units 605 may for example comprise a magnetic or optical disk and disk drive or a solid-state drive (SSD).

In this example, the apparatus 600 comprises one or more input/output (I/O) devices 606 configured to communicate information to and/or from the one or more processors 601. The one or more I/O devices 606 are coupled with the bus 602. The one or more I/O devices 606 may comprise at least one network interface. The at least one network interface may enable the apparatus 600 to communicate via one or more data communications networks. Examples of data communications networks include, but are not limited to, the Internet and a Local Area Network (LAN). The one or more I/O devices 606 may enable a user to provide input to the apparatus 600 via one or more input devices (not shown). The one or more input devices may include for example a remote control, one or more physical buttons etc. The one or more I/O devices 606 may enable information to be provided to a user via one or more output devices (not shown). The one or more output devices may for example include a display screen.

Various other entities are depicted for the apparatus 600. For example, when present, an operating system 607, signal processing module 608, one or more further modules 609, and data 610 are shown as residing in one, or a combination, of the computer-usable volatile memory 603, computer-usable non-volatile memory 604 and the one or more data-storage units 605. The signal processing module 608 may be implemented by way of computer program code stored in memory locations within the computer-usable non-volatile memory 604, computer-readable storage media within the one or more data-storage units 605 and/or other tangible computer-readable storage media. Examples of tangible computer-readable storage media include, but are not limited to, an optical medium (e.g., CD-ROM, DVD-ROM or Blu-ray), flash memory card, floppy or hard disk or any other medium capable of storing computer-readable instructions such as firmware or microcode in at least one ROM or RAM or Programmable ROM (PROM) chips or as an Application Specific Integrated Circuit (ASIC).

The apparatus 600 may therefore comprise a signal processing module 608 which can be executed by the one or more processors 601. The signal processing module 608 can be configured to include instructions to implement at least some of the operations described herein. During operation, the one or more processors 601 launch, run, execute, interpret or otherwise perform the instructions in the signal processing module 608.

Although at least some aspects of the examples described herein with reference to the drawings comprise computer processes performed in processing systems or processors, examples described herein also extend to computer programs, for example computer programs on or in a carrier, adapted for putting the examples into practice. The carrier may be any entity or device capable of carrying the program.

It will be appreciated that the apparatus 600 may comprise more, fewer and/or different components from those depicted in FIG. 6.

Various measures (for example speaker recognition systems, methods, computer programs and computer-readable media) are provided in a speaker recognition system comprises at least one microphone operable to output data representing speech of a speaker. A controller is operable to receive data from the at least one microphone. The received data is processed using a first ANN to obtain first output data, the first ANN having been trained based on outputs of a second ANN, the second ANN having been trained to perform speaker recognition. The speaker is identified using the first output data. The first ANN comprises fewer layers and/or fewer parameters than the second ANN. In some examples, the first ANN is shallower than the second ANN, in that it has fewer layers than the second ANN. In some examples, the first ANN has fewer parameters in each layer than the second ANN. In some examples, the first ANN has both fewer layers and fewer parameters in each layer than the second ANN. The first ANN is configured to emulate a result derivable using an output of the second ANN.

Using a first ANN that has been trained based on outputs of a second, larger ANN trained to perform speaker recognition facilitates a reduction in processing requirements, storage, latency and/or hardware requirements compared to a case in which the second ANN is itself used to identify the speaker. Further, using a first ANN that has been trained to emulate a result derivable from the output of a second, larger ANN facilitates an increase in speaker recognition accuracy and/or reliability compared to a case in which the first ANN is trained to perform speaker recognition directly, rather than based on outputs of an already-trained, larger ANN.

In some examples, the first ANN comprises a student ANN and the second ANN comprises a teacher ANN. As such, teacher-student knowledge distillation may be used to increase an accuracy of the student ANN, by leveraging the knowledge of the teacher ANN.

In some examples, said processing comprises using only the first artificial neural network of the first and the second artificial neural networks. Since the first ANN comprises fewer layers and/or fewer parameters than the second ANN, using only the first ANN reduces an amount of processing, storage, power and/or time required to perform speaker recognition compared to a case in which the second, larger ANN is used to perform speaker recognition.

In some examples, the speaker recognition system comprises a memory, and the speaker recognition system is configured to store the first ANN in the memory. Storing the first ANN in the memory may reduce a latency associated with performing speech recognition, since the first ANN may be accessed more quickly than in a case in which the first ANN is not stored in the speaker recognition system.

In some examples, the second ANN is not stored in the speaker recognition system. By not storing the second ANN in the speaker recognition system, an amount of storage space required in the speaker recognition system may be reduced.

In some examples, the controller is configured to transmit a control signal to control operation of a device in the environment around the speaker recognition system dependent on the identifying of the speaker. As such, the speaker recognition system is able to act as a proxy for the device, enabling the device to be controlled in a new way, namely via the speaker recognition system. Such an interaction technique may have a reduced user burden, and may be more reliable, than if the user were to interact with the device directly. Further, multiple controllable devices may be controlled via a single point of contact for the user, namely the speaker recognition system. Moreover, by controlling the device on the basis of the identification of the user, the speaker recognition device may infer a user's preferred settings and control devices accordingly without requiring explicit instructions from the user, thus reducing user burden. Further, a level of security and/or privacy may be increased, since the speaker recognition system may be configured to only control the device if a particular user is identified, and not if a different person is identified.

In some examples, the speaker recognition system is configured to perform text-independent speaker recognition. As such, a user may not be required to remember and recite a particular passphrase in order to interact with the speaker recognition system. Further, the speaker recognition system may be able to recognize the speaker without the speaker having to interact with the speaker recognition system directly, thereby reducing user burden.

In some examples, the speech is between 2 and 10 seconds in duration. Performing speaker recognition based on such short or ultra-short utterances reduces a latency associated with speaker recognition, and may consequently facilitate more natural user interactions, whilst providing a sufficient amount of data for speaker recognition to be performed sufficiently accurately.

In some examples, the first ANN has been trained based on embedding vectors generated by an intermediate layer of the second ANN. The embedding vectors may have a higher dimensionality than the output of the final layer of the second ANN. Embedding vectors extracted from an intermediate layer of the second ANN may be a more reliable training target for the first ANN than an output from the final layer of the second ANN. As such, using embedding vectors as training targets for the first ANN may result in the first ANN having a greater speaker recognition accuracy than using other data as training targets. Moreover, embedding vectors generated by an ANN may be re-used in other tasks, enabling multi-task learning and performance.

In some examples, the at least one microphone comprises an array of microphones, and wherein the controller is configured to process the received data from the array of microphones using a beamforming function. The use of the beamforming function may facilitate a more accurate processing of received acoustic signals.

In some examples, the speaker recognition system is comprised in a robot. As such, an embedded device having relatively low power, storage and/or on-board processing capabilities may be provided with reliable and accurate speaker recognition functionality. Therefore a need to upgrade the hardware capabilities of the robot to perform speaker recognition may be reduced.

In some examples, the received data is processed using a third ANN to obtain second output data. The third ANN has been trained based on outputs of a fourth ANN. The fourth ANN has been trained to perform speaker recognition. The identifying the speaker further comprises using the second output data. The third ANN comprises fewer layers and/or fewer parameters than the fourth ANN. The third ANN is configured to emulate a result derivable using an output of the fourth ANN. The second ANN and the fourth ANN have different architectures and/or have been trained using different objective functions. Using multiple student ANNs having been trained based on the outputs of different teacher ANNs having different architectures and/or having been trained using different objective functions increases an ultimate accuracy of speaker recognition performed using the student ANNs, compared to a case in which a single student ANN and single teacher ANN is used.

In some examples, the first ANN is trained based on outputs of a fourth ANN, the fourth ANN having been trained to perform speaker recognition. The first ANN comprises fewer layers and/or fewer parameters than the fourth ANN. The second ANN and the fourth ANN have different architectures and/or have been trained using different objective functions. Training a single student ANN based on the outputs of multiple teacher ANNs having different architectures and/or having been trained using different objective functions may increase an accuracy of speaker recognition performed using the student ANN compared to a case in which a single teacher ANN is used to train the student ANN. Further, using a single student ANN may reduce an amount of processing and/or storage compared to using multiple student ANNs.

In some examples, the second ANN is trained using one of a cross entropy objective function and a triplet loss objective function. The fourth ANN is trained using the other of the cross entropy objective function and the triplet loss objective function. The use of such objective functions may result in a more accurate ANN for performing speaker recognition than the use of other objective functions.

In some examples, processing the received data comprises deriving a set of mel-frequency cepstral coefficients from the received data, and inputting the derived set of mel-frequency cepstral coefficients to the first artificial neural network. Deriving a set of mel-frequency cepstrum coefficients from the received data enables the extracted audio features to more closely match what humans perceive than may otherwise be the case.

In some examples, enrolment data is received from the at least one microphone. The enrolment data represents enrolment speech of the speaker. The first ANN is trained to identify the speaker using the received enrolment data. The content of the speech is different from the content of the enrolment speech. As such, the user does not have to remember the enrolment speech when subsequently interacting with the speaker recognition system, thereby reducing user burden.

Various measures (for example systems, methods, computer programs and computer-readable media) are provided in which a system is configured to perform speaker recognition using at least one student artificial neural network, the at least one student artificial neural network having been trained to emulate an output of at least one teacher artificial neural network. As such, an amount of power, storage and/or processing required to perform speaker recognition using artificial neural networks is reduced compared to a case in which the teacher artificial neural network is itself used to perform speaker recognition. Thus, speaker recognition functionality may be provided more readily in low power embedded devices.

Various measures (for example systems, methods, computer programs and computer-readable media) are provided in which first data is received, the first data representing a first portion of an utterance of a speaker. The first data is processed using an artificial neural network to obtain first output data. Second data is received, the second data representing a second portion of the utterance. The second portion of the utterance has been uttered after the first portion of the utterance. The second data is processed using the artificial neural network to obtain second output data. The first output data and the second output data are used to identify the speaker of the utterance. The processing of the first data begins before the second data is received in full. As such, speaker recognition processing may be performed "on the fly" in an online manner, without waiting for a complete utterance to be received. Thus latency may be reduced compared to a case in which an utterance is received in its entirety before being processed.

Various measures (for example speaker recognition systems, methods, computer programs and computer-readable media) are provided in which a speaker recognition system comprises at least one microphone operable to output data representing an utterance of a speaker. The speaker recognition system further comprises a controller operable to receive the output data from the at least one microphone. The controller is operable to process the received data using a first artificial neural network to obtain first output data. The controller is further operable to process the received data using a second artificial neural network to obtain second output data. The first and second artificial neural networks have each been trained to perform speaker recognition. The speaker of the utterance is identified using the first output data and the second output data. The first artificial neural network and the second artificial neural network have different architectures and/or have been trained using different objective functions. Using multiple artificial neural networks having different architectures and/or having been trained using different objective functions increases an accuracy of speaker recognition performed using the artificial neural networks, compared to a case in which a single artificial neural network is used.

Various measures (for example speaker recognition systems, methods, computer programs and computer-readable media) are provided in which a first speaker recognition model is compressed using a knowledge distillation compression technique to generate a second speaker recognition model. An utterance is received from a human via a microphone. The second speaker recognition model and data based on the received utterance are used to perform speaker recognition in relation to the received utterance. Compressing the first speaker recognition model using a knowledge distillation compression technique enables speaker recognition to be performed with a reduced requirement of processing, storage, latency and/or power whilst maintaining a sufficient level of accuracy.

Various measures (for example speaker recognition systems, methods, computer programs and computer-readable media) are provided in which audio data representing a human voice is received. Data based on the received audio data is used along with a first model that has been obtained from a second model using knowledge distillation to perform text-independent speaker recognition in relation to the received audio data. As such, a user is not required to memorize and recite a particular passphrase, as would be the case in text-dependent speaker recognition. Using a first model that has been obtained from a second model using knowledge distillation allows text-independent speech recognition to be performed with a higher accuracy compared to a case in which the first model is not obtained using knowledge distillation.

Various measures (for example speaker recognition systems, methods, computer programs and computer-readable media) are provided in which a sound is received from a human via a microphone. Using (a) data based on the received sound, and (b) a first artificial neural network whose output emulates an intermediate layer of a second, larger neural network, said human is recognized. Using an artificial neural network whose output emulates an intermediate layer of a larger artificial neural network increases an accuracy of speaker recognition compared to case in which the output of the artificial neural network does not emulate an intermediate layer of a larger artificial neural network. Accuracy of speaker recognition may be increased relative to a comparative case in which the output of the artificial neural network emulates a final layer, rather than an intermediate layer, of the larger artificial neural network.

Various measures (for example systems, methods, computer programs and computer-readable media) are provided in which a first neural network is trained to be used in speaker recognition. An embedding vector is extracted from the first neural network, the embedding vector being an intermediate output of the first neural network. The extracted embedding vector is used as a target for training a second, smaller neural network. Embedding vectors may be a more reliable training target for the first neural network than an output from the final layer of the second neural network. As such, using embedding vectors as training targets for the first neural network may result in the first neural network having a greater speaker recognition accuracy than using other data as training targets. Moreover, embedding vectors may be re-used in other tasks, enabling multi-task learning and performance, and thereby increasing device functionality and/or scalability.

Various measures (for example electronic devices, methods, computer programs and computer-readable media) are provided in which an electronic device comprises a microphone configured to output data based on sound received from a human speaker. The electronic device also comprises a processor configured to receive the data output by the microphone, and use the received data and an artificial neural network stored in the memory of the electronic device to identify the human speaker. The electronic device is an in-car human-computer interface system and/or a digital home assistant. As such, embedded devices such as in-car human-computer interface systems and digital home assistants may be provided with accurate, small-footprint, speaker recognition functionality.

Various measures (for example speaker recognition systems, methods, computer programs and computer-readable media) are provided in which noise is received from a human speaker. The received noise and a teacher-student-trained artificial neural network are used to perform text-independent speaker recognition on the received noise. A teacher-student-trained artificial neural network may perform text-independent speaker recognition more accurately and/or with a smaller footprint in terms of power, storage, latency and/or processing requirements, compared to other speaker recognition systems.

The above embodiments are to be understood as illustrative examples. Further embodiments are envisaged.

In examples described above, speakers are recognized on the basis of speech detected by one or more microphones. In other examples, sounds other than speech are detected and used to recognize the source of such sounds. Such sounds may be vocal or non-vocal. Examples of such sounds include, but are not limited to, singing, whistling and clapping. Such sound sources may be human or non-human.

In examples described above, speaker recognition is performed on the basis of data obtained by one or more microphones. In other examples, microphones are not involved in the performance of speaker recognition. For example, speaker recognition may be performed on the basis of stored audio data representing speech of a speaker.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A speaker recognition system comprising:
    at least one microphone operable to output data representing speech of a speaker; and
    a controller operable to:
       receive the data output from the at least one microphone;
       process the received data using a first artificial neural network to obtain first output data, the first artificial neural network having been trained based on outputs of a second artificial neural network, the second artificial neural network having been trained to perform speaker recognition;

process the received data using a third artificial neural network to obtain second output data, the third artificial neural network having been trained based on outputs of a fourth artificial neural network, the fourth artificial neural network having been trained to perform speaker recognition, and identify the speaker using the first output data and the second output data, wherein the first artificial neural network comprises fewer layers and/or fewer parameters than the second artificial neural network, and wherein the first artificial neural network is configured to emulate a result derivable using an output of the second artificial neural network wherein the third artificial neural network comprises fewer layers and/or fewer parameters than the fourth artificial neural network, wherein the third artificial neural network is configured to emulate a result derivable using an output of the fourth artificial neural network, and wherein the second artificial neural network and the fourth artificial neural network have different architectures and/or have been trained using different objective functions.

2. The speaker recognition system according to claim 1, wherein the first artificial neural network comprises a student artificial neural network, and the second artificial neural network comprises a teacher artificial neural network.

3. The speaker recognition system according to claim 1, wherein the speaker recognition system comprises a memory, and wherein the speaker recognition system is configured to store the first artificial neural network in the memory.

4. The speaker recognition system according to claim 1, wherein the second artificial neural network is not stored in the speaker recognition system.

5. The speaker recognition system according to claim 1, wherein the controller is configured to transmit a control signal to control operation of a device in the environment around the speaker recognition system dependent on the identifying of the speaker.

6. The speaker recognition system according to claim 1, wherein the speaker recognition system is configured to perform text-independent speaker recognition.

7. The speaker recognition system according to claim 1, wherein the speech is between 2 and 10 seconds in duration.

8. The speaker recognition system according to claim 1, wherein the first artificial neural network has been trained based on embedding vectors generated by an intermediate layer of the second artificial neural network.

9. The speaker recognition system according to claim 1, wherein the at least one microphone comprises an array of microphones, and wherein the controller is configured to process the received data from the array of microphones using a beamforming function.

10. The speaker recognition system according to claim 1, wherein the speaker recognition system is comprised in a robot.

11. A computer-implemented method for performing speaker recognition, the method comprising:

receiving data from at least one microphone, the data representing speech of a speaker;

processing the received data using a first artificial neural network to obtain first output data, the first artificial neural network having been trained based on outputs of a second artificial neural network, the second artificial neural network having been trained to perform speaker recognition;

processing the received data using a third artificial neural network to obtain second output data, the third artificial neural network having been trained based on outputs of a fourth artificial neural network, the fourth artificial neural network having been trained to perform speaker recognition, and identifying the speaker using the first output data and the second output data, wherein the first artificial neural network comprises fewer layers and/or fewer parameters than the second artificial neural network, wherein the first artificial neural network is configured to emulate a result derivable using an output of the second artificial neural network, wherein the third artificial neural network comprises fewer layers and/or fewer parameters than the fourth artificial neural network, wherein the third artificial neural network is configured to emulate a result derivable using an output of the fourth artificial neural network, and wherein the second artificial neural network and the fourth artificial neural network have different architectures and/or have been trained using different objective functions.

12. The method according to claim 11, wherein the first artificial neural network is trained based on outputs of the fourth artificial neural network, and wherein the first artificial neural network comprises fewer layers and/or fewer parameters than the fourth artificial neural network.

13. The method according to claim 11, wherein the second artificial neural network is trained using one of a cross entropy objective function and a triplet loss objective function, and wherein the fourth artificial neural network is trained using the other of the cross entropy objective function and the triplet loss objective function.

14. The method according to claim 11, wherein the processing the received data comprises deriving a set of mel-frequency cepstral coefficients from the received data, and inputting the derived set of mel-frequency cepstral coefficients to the first artificial neural network.

15. The method according to claim 11, the method comprising:

receiving enrolment data from the at least one microphone, the enrolment data representing enrolment speech of the speaker; and training the first artificial neural network to identify the speaker using the received enrolment data, wherein the content of the speech is different from the content of the enrolment speech.

16. A method of performing speaker recognition, comprising:

receiving sound from a human via a microphone; and using (a) data based on the received sound and (b) a first artificial neural network whose output emulates an intermediate layer of a second, larger neural network to recognize said human;

processing data based on the received sound using a third artificial neural network to obtain output data, the third artificial neural network having been trained based on outputs of a fourth artificial neural network, the fourth artificial neural network having been trained to perform speaker recognition, wherein recognizing said human further comprises using the output data, wherein the third artificial neural network comprises fewer layers and/or fewer parameters than the fourth artificial neural network, wherein the third artificial neural network is configured to emulate a result derivable using an output of the fourth artificial neural network, and wherein the second artificial neural network and the fourth artificial neural network have different architectures and/or have been trained using different objective functions.

17. A non-transitory computer readable storage medium comprising instructions which, when executed, cause a speaker recognition system to perform a method according to claim 11.

* * * * *